Dec. 22, 1953     O. J. GAGNE     2,663,537
PORTABLE HOSE SHUTOFF DEVICE
Filed Aug. 20, 1948     2 Sheets-Sheet 1

INVENTOR.
OVILA J. GAGNE
BY
Pearson + Pearson
ATTORNEYS

Dec. 22, 1953        O. J. GAGNE        2,663,537
PORTABLE HOSE SHUTOFF DEVICE

Filed Aug. 20, 1948        2 Sheets-Sheet 2

INVENTOR.
Ovila J Gagne
BY
Pearson & Pearson
Attorneys

Patented Dec. 22, 1953

2,663,537

UNITED STATES PATENT OFFICE 2,663,537

PORTABLE HOSE SHUTOFF DEVICE

Ovila J. Gagne, Manchester, N. H.

Application August 20, 1948, Serial No. 45,292

5 Claims. (Cl. 251—5)

This invention relates to what might be called emergency valves to be used under certain circumstances with fire department hose, especially where there is a high pressure. The pressure may be one hundred-forty pounds or more and the hose pipe may be a long distance from a hydrant or pump and may be up in a high building.

In many cases the hose pipe has a shut off valve in the nozzle but in some cases it is desirable to change the nozzle and it is not possible on account of smoke or for other reasons, including delay, to shut off the water in the street. In such a case this emergency valve can be used to shut off the water while the nozzle is changed.

In other cases a hose may break at some point where the water will do great damage and it may not be convenient to shut the water off at the hydrant or pump. In some hydrants there are several nipples for the hose but only one shut off valve and in such a case this device can be used to shut off any one of the attached hose pipes. This may be desirable in case some one pipe bursts and it is desirable to disconnect a section in which the burst is located.

As the pressure may rise to three hundred pounds in order to reach high buildings and there is always a very substantial pressure in a fire hose while being used, a great deal of strength is necessary in order to close an emergency valve. I utilize hydraulic pressure with a special kind of supporting member, jaws and handle.

A fireman can run up a ladder or to any place where the water is to be shut off carrying the device in one hand or with his arm between the jaws and under the handle; drop it to the floor, push jaw holding member 5 up against the hose H1, release handle A, lift the hose over jaw G, and drop it between jaws G and F and then start pumping up pressure in the hydraulic jack as much as necessary to reduce or entirely shut off the stream of water.

There are a number of types of link and lever operable emergency valves such as shown in patent to Kellam, No. 1,701,411, of February 5, 1929, and there are other types in which an hydraulic jack is used as in patent to Kick, No. 2,098,548, of November 9, 1937, but in the link and lever operable Kellam type, great leverage or great strength is required and in the Kick type, it is necessary to push the hose through an opening in order to be squeezed, while in the type shown by Kick and by Brittain, No. 2,150,262, of March 14, 1939, there are returning springs, latches, hinges and other parts which make it complicated and heavy as well as expensive.

My device is very compact, simple, light and easy to carry anywhere. Its operating handle becomes a carrying handle. To use, the valve with its jack is laid down on its bottom which preferably is of greater length than width with its jaws open at the top, the handle is unhooked, a hose pipe dropped down between the open jaws, the operating handle swung for pumping up hydraulic pressure to squeeze the hose between the jaws which are so shaped and placed that the hose cannot escape, all in a matter of seconds and when it is not in use, the handle serves as a carrier, the whole device being so light that a fireman can easily carry it to any part of a building and even up on a ladder. No returning springs such as shown by Brittain and Kick are needed as the water pressure of the hose or hand pressure are ample to open the jaws.

The release and other jack valves allow the pressure to be partly reduced and therefore the size of the passage in the hose and the volume of water to be regulated and no lock is necessary to keep the jaws in any desired position or to be released entirely as an hydraulic jack is a positive action device which locks itself when pumping stops.

The main feature of this device are that it can be set down flat on its bottom with a clamp construction having jaws which are open at the top and are always unobstructed, so that the hose can quickly be dropped in place, that it is of a light construction and that it has a handle which can be used as a carrying means and also as a pumping means.

Preferably the socket for the handle is pivoted to the side of the jack and the handle has a relatively straight shank with a socket end bent at about sixty degrees out of line and is turnable in the socket so that when the free end of the handle is released from its carrying holder and the handle is turned about one hundred and eighty degrees, its free end can be moved towards and away from the jaws in a vertical, longitudinal plane while pumping the hydraulic jack.

Figure 5:
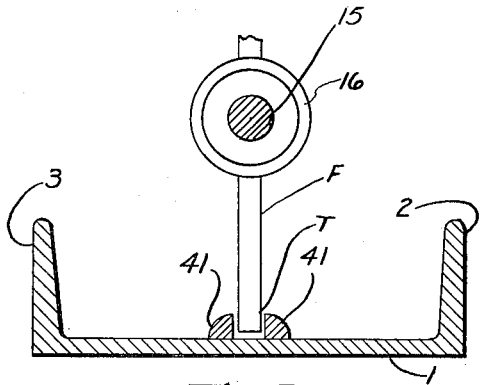
Fig. 5 is a diagrammatic sectional view as on the line 5—5 of Fig. 3, but with the base resting flat on a support.

In the drawings H1 represents an inflated hose and H2 the same hose when it is compressed so that the flow of water is stopped. B is a supporting member which, as shown, is made of relatively thin metal with an oblong bottom 1 along part of which extends a track T, which, as shown, includes two rails 41 and 41, Fig. 5. At one end which I will call the jack end is a jack base holder 4 which extends up from the bottom 1 and has two sides 32 and 33, Fig. 3, which are extensions of the two sides 2 and 3 of the bottom member. At the other or hose jaw end is a jaw holding member 5, Figs. 2 and 3, which includes two parallel members 34 and 35 extending up from that end of the bottom 1.

Figure 1:
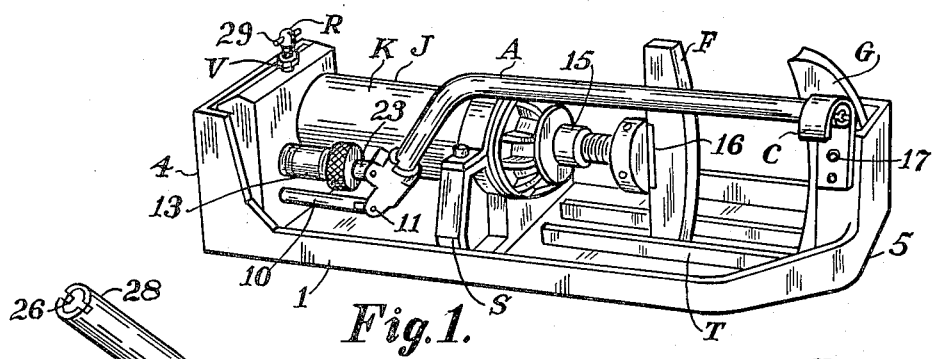
Fig. 1 is a side perspective view of the portable shut-off device with the handle bent down with its end held by a handle end holder and with the clamp jaws opened at the top, all in position to be carried, with a part broken away to show the track in the base.

Near the middle between the base end and the jaw end is a jack holding yoke 45 on support S for the middle part of a jack J. This at the top is curved to fit the outside of the middle part of jack J and extending over the top of such jack is a strap. The jack base holder 4, as shown, is made for a rectangular base 9 of the jack J which is of a well known type such as shown in the patent to Dybens "Check Valve Unit for Hyraulic Jacks" of December 14, 1926, No. 1,610,499. It includes a base 9 to fit base holder 4, a cylindrical body K attached to the base, a piston slidable in a cylinder in the body K both similar to Dybens, the piston having a rod 15 extending out therefrom. This piston rod 15 carries a convex jaw member F which, as shown, is fixed at 16 to this piston rod. The bottom of jaw F is shown, Figs. 1, 2, 3, as extending down into and slidable along track T between rails 41 and 41 with a loose fit, so that there is no danger of jamming.

Figure 2:
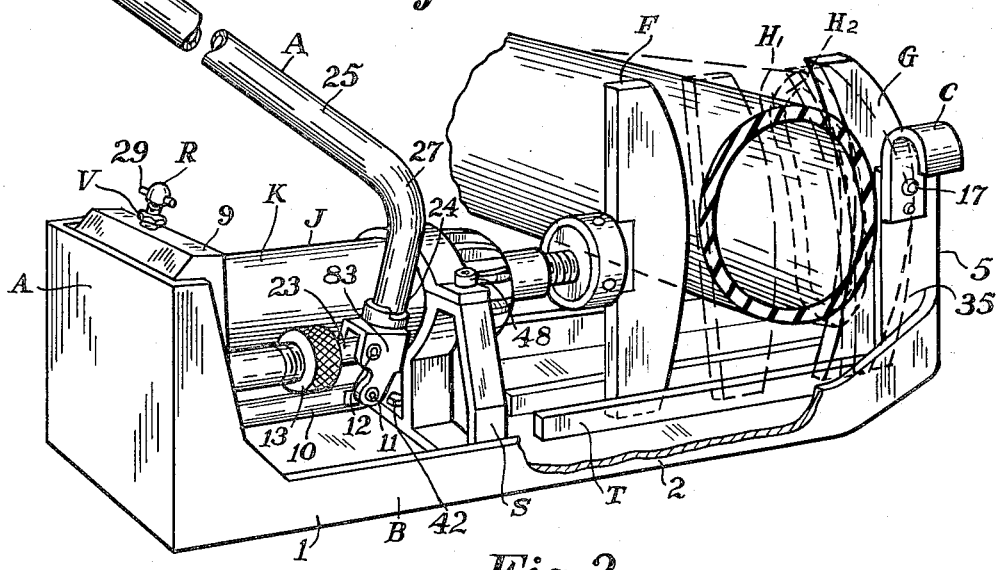
Fig. 2 is a perspective view from the side similar to Fig. 1, but at a different angle and with the operating handle, released from the handle end holder, in pumping position, a part also being broken away to show the interior, with a hose in full lines being introduced and in dotted lines shown as being compressed.
Figure 3:
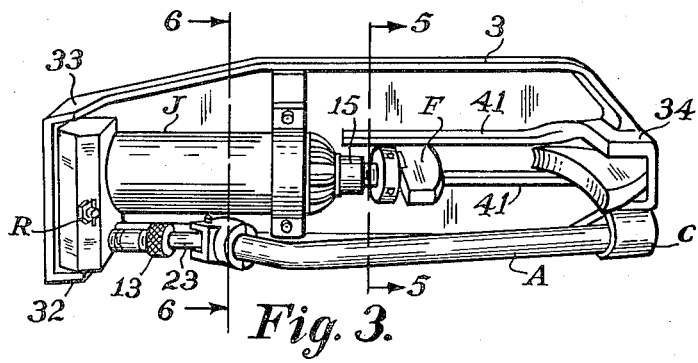
Fig. 3 is a plan view as from the top of Fig. 1.

There is a concave jaw G pivoted at 17 between the two sides 34 and 35 of the jaw holding member 5, Figs. 2 and 3, and the bottom end of this concave or crescent shaped member also extends down to track T and is also loosely slidable therein between rails 41 and 41.

Pivot 17 is preferably high enough above track T to be above the centre of the hose being operated on, but the weight of the hose will hold it down between jaws F and G.

As shown in Fig. 2, when the jaw G is tipped, or pivoted, outwardly at its upper portion a hose H1 can readily pass downwardly between the jaw G and the jaw F whereby the hose H1 will rest on the two sides 2 and 3 of the bottom or base 1 of supporting member B. When pressure is applied through the hydraulic jack J, by means of the handle A, the jaws F and G compress the hose as indicated at H2, in dotted lines in Fig. 2, thereby partially, or completely, shutting off the flow of water.

The jack J has suitable valves operable by the pressure of the liquid in the cylinder thereof for automatically controlling the movement of the piston rod 15. Pressure in the cylinder is produced by a pump assembly including a plunger 23, moved back and forth in its barrel 13, the plunger 23 being reciprocated by handle A. As shown, the handle A is provided with a curved or bent socket end 24 which in turn is provided with a pin 50, extending entirely through handle A and positioned preferably slightly removed from the diametrical centre line of the curved end 24. Operating handle A is bent at about sixty degrees at 27 and then extends straight at the shank 25 to its free opposite end 26, the end 26 being provided with a slot 28. The slot 28 of handle A may be engaged on the ears 29 of a release valve R, of a well known type, for releasing the pressure in jack J. V is a gland of valve R.

Figure 7:
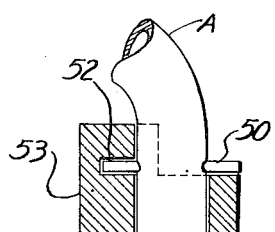
Fig. 7 is a detail of the preferred type of handle with pin and socket.

A handle carrier 83 is provided, pivoted at 11 to a fixed member 10, carried by the base 9 of jack J, and pivotally connected at 12 to the terminal end of the plunger 23. Handle carrier 83 includes a handle socket 53, provided with a nearly annular pin groove 52 for accommodating pin 50 of the handle A. A handle socket extension of handle socket 53, shown in dotted lines in Fig. 7, is cut away to permit pin 50 to be introduced into and removed from, groove 52 or to be held by the groove 52 when turned angularly through a small arc or quadrant.

Instead of the preferred pin and slot connections described above, the release valve R could be turned by the fingers of the operator on ears 29 or by a suitable key or wrench. Similarly the ears could be replaced by a handle or turning knob.

The bend at 27 in handle A permits the handle to be used in actuating plunger 23 of jack J and also enables the handle to be locked in place under a handle end holder C to thereby serve as a convenient carrying handle for the entire device.

Figure 6:
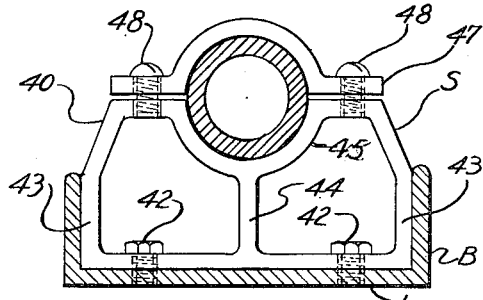
Fig. 6 is a view similar to Fig. 5 as on the line 6—6 of Fig. 3.

The jack support S, as best shown in Fig. 6, is of the skeleton variety and includes a base 40 which abuts on the terminal ends of the track T and projects upwardly from the bottom 1 of supporting member B. Cap screws 42, 42 retain support S on the bottom 1 and a pair of oppositely disposed upright end legs such as 43, as well as an upright central leg 44, are joined by an integral semi-circular yoke piece 45. A strap 47 having a complementary semi-circular yoke piece is removably connected to the base portion 40 of support S by machine screws 48, 48 whereby the cylinder portion of jack J is supported and retained by the jack holding yoke 45 and strap 47.

Figure 4:
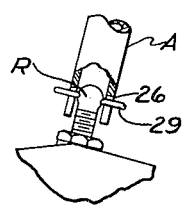
Fig. 4 is a detail showing how the handle end is used to turn the release valve.
Figure 8:
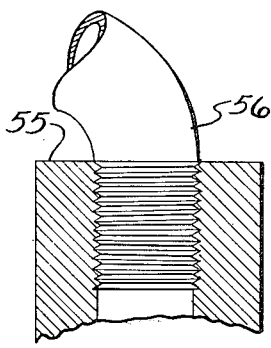
Fig. 8 is a similar view of an alternative type of socket connection.
Figure 9:
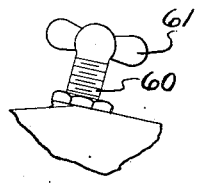
Fig. 9 is a detail view of a manually operable jack release valve.

As shown in Fig. 8, the curved end 24 of handle A may be threadedly connected to a socket 55 of a handle carrier 83 by means of threads 56. In such case the valve R may be turned by the fingers of the operator applied to winged ears such as 61, on a valve stem 60, as shown in Fig. 9. Preferably, however, the handle A is unthreaded and quickly releasable in order to secure the leverage of slot 28 applied to the ears 29 of a valve such as shown in Fig. 4. With a threaded connection such as indicated in Fig. 8 the handle A can be rotated sufficiently to permit the locking and unlocking of its end 26 under the handle end holder C.

The construction shown in the drawings is preferred but other types of hydraulic jacks may be used with suitable variations in the jack base holder and jack cylinder holder. Both such holders could be included in one integral holder for retaining a jack in a horizontal position. The track for the advancing jaw and the pivoted jaw in the supporting member could be a single rail entering a groove in the jaws or the track might be omitted.

While it is preferred to have a concave jaw properly pivoted and a convex jaw cooperating with it, both might have straight hose engaging surfaces and both might be fixed rather than pivoted. By rearrangement of the angular relation of the handle socket in a handle carrier, a straight handle might be used and the handle end holder might be a different construction from that shown at C for example, a flexible strap, but it should not be omitted altogether.

I claim:

1. A portable emergency shut-off device for a high pressure fire hose, said device comprising a supporting member including a base with two sides and two ends, a jack base holder extending up from one end having an end wall and side walls, a jack holding yoke extending up from near the middle of said member and a hose jaw holding member extending up from the other end and including a handle end holder; a concave hose jaw member pivoted to the hose jaw holding member; an hydraulic jack including a body with a base positioned in the base holder, a cylinder attached to the jack holding yoke by a strap, a piston rod projecting from the cylinder, a pump assembly operatively connected to a handle carrier, said carrier being pivoted to the jack body and including a handle socket extension; an operating handle having a shank and a bent socket end turnable in and engaging said extension and a free handle end adapted to engage the handle end holder to retain the handle shank in substantial parallel alignment with the base of the supporting member for carrying the device, the handle being so shaped and the carrier being so pivoted that when the free end is released from its holder and it is turned in its socket, the free end is moved in an arc substantially parallel to the base of the supporting member and in its pumping operation is moved in a plane normal to said base; and a convex jaw member fixed to the projecting piston rod whereby the last named jaw member may be moved towards the other jaw member to pinch a hose placed between them when the hydraulic jack is operated by the handle.

2. A device as specified in claim 1 plus a pair of parallel upstanding tracks, each extending axially along the base of said supporting member on an opposite side of, and in loose slidable engagement with, the lower portion of said convex jaw member and adapted to guide said jaw as it moves from open position to closed position.

3. A device as specified in claim 2 wherein the lower portion of said concave hose jaw member extends downwardly between, and into loose slidable engagement with said tracks whereby said concave hose jaw member is guided therein as it moves on its pivotal connection to said hose jaw holding member.

4. A device as specified in claim 1 plus a partiannular pin groove in said handle socket extension and a pin proximate the tip of the bent socket end of said operating handle, said pin being seated in said groove but releasable therefrom when said handle is turned through a quadrant in either angular direction.

5. A device as specified in claim 1 wherein said handle socket extension is interiorly threaded and the bent socket end of said operating handle is exteriorly threaded to engage said interior threads.

OVILA J. GAGNE.

References Cited in the file of this patent

UNITED STATES PATENTS

| Number | Name | Date |
|---|---|---|
| 1,701,411 | Kellam | Feb. 5, 1929 |
| 2,009,907 | Teuber | July 30, 1935 |
| 2,010,229 | Goff | Aug. 6, 1935 |
| 2,098,548 | Kick | Nov. 9, 1937 |
| 2,107,970 | Wells | Feb. 8, 1938 |
| 2,150,262 | Brittain | Mar. 4, 1939 |
| 2,562,755 | Walker | July 31, 1951 |

FOREIGN PATENTS

| Number | Country | Date |
|---|---|---|
| 139,942 | Great Britain | 1920 |
| 257,902 | Great Britain | of 1927 |